Dec. 22, 1959 M. J. RELIS 2,918,653

CHARACTER RECOGNITION DEVICE

Filed Feb. 6, 1957 3 Sheets-Sheet 1

INVENTOR.
MATTHEW J. RELIS
BY
Eli Weiss
ATTORNEY

Dec. 22, 1959 M. J. RELIS 2,918,653

CHARACTER RECOGNITION DEVICE

Filed Feb. 6, 1957 3 Sheets-Sheet 2

INVENTOR.
MATTHEW J. RELIS
BY
Eli Weiss
ATTORNEY

Dec. 22, 1959 M. J. RELIS 2,918,653

CHARACTER RECOGNITION DEVICE

Filed Feb. 6, 1957 3 Sheets-Sheet 3

INVENTOR.
MATTHEW J. RELIS
BY
Eli Weiss
ATTORNEY 2,918,653

CHARACTER RECOGNITION DEVICE

Matthew J. Relis, Bayside, N.Y., assignor to Burroughs Corporation, Detroit, Mich., a corporation of Michigan Application February 6, 1957, Serial No. 638,523

11 Claims. (Cl. 340—149)

This invention relates in general to character recognition devices and more particularly to a device that identifies a symbol by comparing a pattern of signals that represents the scanned symbol with generated signals that represent each of the symbols to be identified.

Presently, character recognition devices that scan conventional symbols require that the symbols be clear, distinct, well defined, and registered very accurately relative to a predefined area. A slight misplacement of the scanned symbol either vertically or horizontally, or the presence of a symbol that is not distinct and well defined will probably remain unidentified or cause an erroneous identification.

Other character recognition devices require a symbol that is not of conventional shape or that utilizes indexing marks positioned within close proximity to the symbol to be identified. In the first instance the characters are no longer readable and in each special type is required to print the characters.

Practically all types of character recognition devices are limited to the identification of a relatively small number of symbols and the programming of the devices for the recognition of other symbols is very difficult if not impossible.

None of the above mentioned type of character recognition devices can identify the conventional printed or typewritten symbols utilized on a sheet of paper to convey information when the symbols are not accurately registered relative to each other or to a predetermined reference line nor when they are not distinct and well defined.

It is a primary object of this invention to provide an improved character recognition device that can identify conventional symbols.

It is another object of this invention to provide an improved character recognition device that can identify accurately symbols that are out of register.

It is still another object of this invention to provide an improved character recognition device that can identify accurately symbols that are slightly smudged or deformed.

It is an additional object of this invention to provide an improved character recognition device that can be programmed easily to identify preselected symbols.

It is an additional object of this invention to provide an improved character recognition device that can rapidly identify a relatively large number of distinctive symbols.

It is an additional object of this invention to provide an improved character recognition device which is reliable in operation and economical to produce.

Other objects and many of the attendant advantages of this invention will be readily appreciated as the apparatus becomes better understood by reference to the following detailed description when considered in connection with the accompanying drawings wherein.

Figure 1:
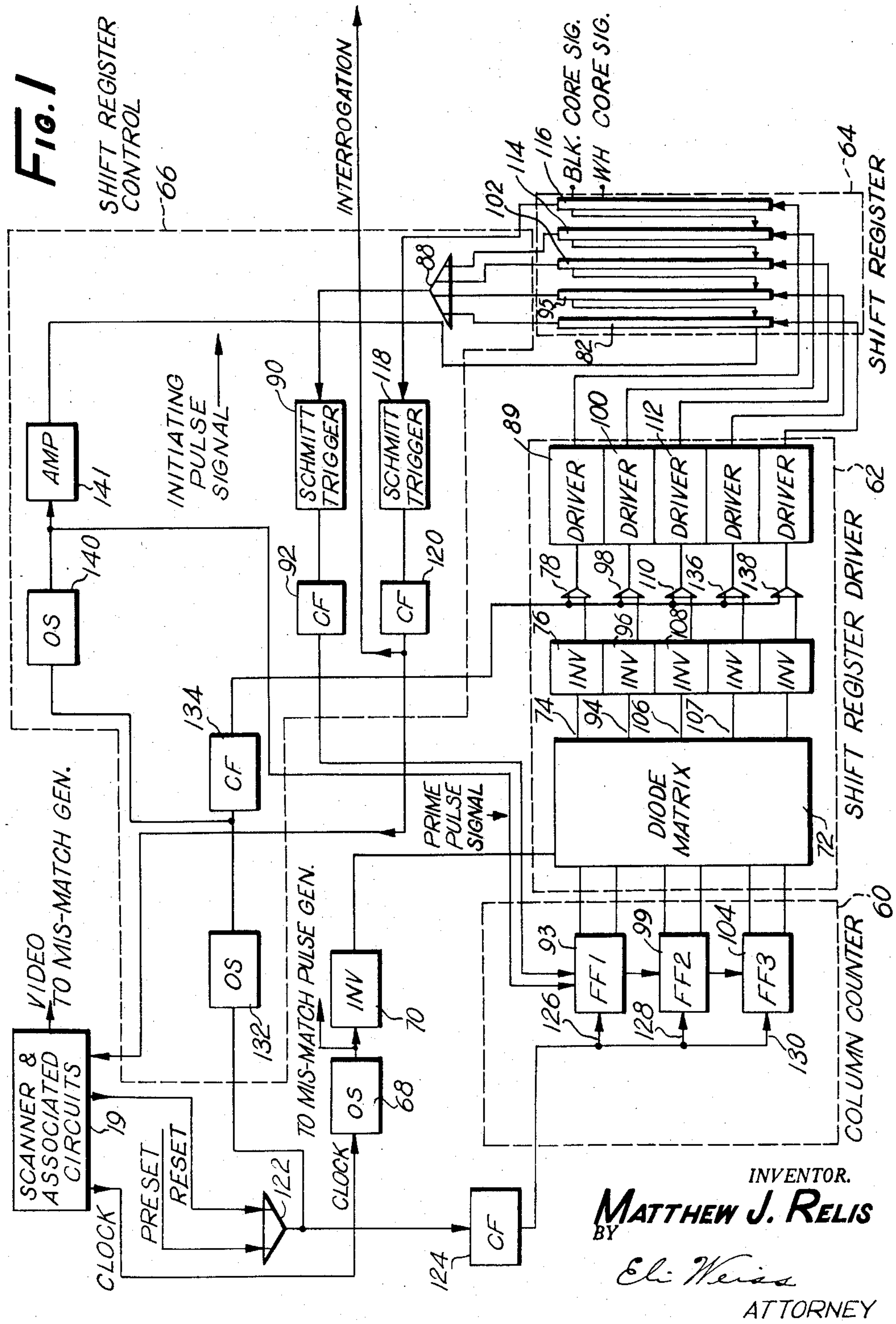
Fig. 1 is a detailed block diagram of a portion of the invention.

Briefly, every printed symbol is confined within a predetermined allotted area. A scanning means divides this area into a specific number of small areas and scans these small areas sequentially. For purposes of explanation it shall be assumed that the symbol appears as a dark configuration on a contrasting light background. During the scanning of the allotted area, the sensing means of the scanner generates a video signal having one of two values to represent either the presence of a portion of the symbol or the contrasting background. It shall be assumed that a more negative signal represents the presence of the light background and a more positive signal represents the presence of a portion of the symbol.

The two-valued video signal is gated with a train of positive-going potential pulse signals to produce a first sequence of clocked positive-going potential pulse signals. Each clocked pulse signal of the first sequence represents the presence of a portion of the symbol. The two-valued video signal is also inverted to generate a new video signal that has a more positive potential signal when the light background portion of the allotted area is scanned, and a more negative potential signal when a portion of the darker symbol is scanned. This inverted video signal is also gated with a train of positive-going potential pulse signals to produce a second sequence of clocked positive-going potential pulse signals. Each clocked pulse signal of the second sequence represents the absence of a portion of the symbol.

The first sequence of clocked positive-going potential pulse signals will hereinafter be referred to as clocked black video signals; and the second sequence of clocked positive-going potential pulse signals will be hereinafter referred to as clocked white video signals.

A magnetic core matrix is prewired with a plurality of pairs of conductors to generate a plurality of patterns of serial signals simultaneously. The signals that appear on each pair of conductors represents a particular symbol. A first conductor of each pair of conductors generates positive-going pulse signals that correspond to the black video signals and shall hereinafter be referred to as the black core signals. The second conductor of each pair of conductors generates positive-going pulse signals that correspond to the white core signals and shall hereinafter be referred to as the white core signals.

Ideally, for any particular symbol, the black video signal is identical with the black core signal and the white video signal is identical with the white core signal.

In actual practice, however, the black and white core signals do not contain pulses that represent the boundaries of the symbols when it is not certain whether a pulse belongs in the black core signal or in the white core signal.

Now, if the clocked black video signals and the white core signals for a particular symbol "X" are fed to the input terminals of a first positive "and" gate, then under ideal conditions, no pulse signals will appear at the output terminal of the gate as there will not be any coincidence between the positive-going pulses of the two input signals. The same conditions prevail when the clocked white video signals and the black core signals of the same symbol "X" are fed to the input terminals of a second positive "and" gate.

The output terminals of the first and second positive "and" gates are connected to the input terminals of a positive "or" gate. Thus, all pulse signals that appear at the output terminals of the first and second "and" gates also appear at the output terminal of the "or" gate and, since there are no signals present at the output terminals of the "and" gates, no signals will appear at the output terminal of the "or" gate.

The situation is different, however, if the clocked black video signals and clocked white video signals that represent the symbol "X" are combined in the "and" gates with white and black core signals that represent a symbol other than "X." In this instance there will be some coincidence of the positive pulse signals fed to the input terminals of the "and" gates, and a number of positive pulse signals will appear at the output terminal of the "or" gate.

For each particular symbol that is to be identified, there is a set of "and" gates, and an "or" gate fed by the set of "and" gates. Each set of "and" gates is coupled to receive the clocked black video signal, the clocked white video signals and a particular set of black and white core signals. The black and white core signals that are fed to each set of gates represent a separate and distinct symbol while the clocked black and white video signals represent the symbol that is scanned and is to be identified. If a particular symbol "Y" is scanned, only the "and-or" gate combination that receive the black and white core signals representative of the symbol "Y" will exhibit a zero signal output; all other "and-or" gate combinations will exhibit pulse signal outputs.

In practice, the signal that appears at the output terminal of the "and-or" gate combination or the symbol scanned may be some value greater than zero as a result of imperfections in the printing of the symbol such as smudges, registration and the like. The number of pulse signals that appear at the output terminal of the "and-or" gate combination that represents the scanned symbol will be, however, smaller than the number of pulse signals that appear at the output terminal of any of the other "and-or" gate combinations. To detect the "and-or" gate combination that exhibits the minimum number of pulse signals, and therefore, to identify the symbol scanned, the output terminal of each "or" gate is coupled to a step charger. The step charger generates a specific increment of output potential each instant that a pulse signal is fed to it.

Now, if each step charger is set to a discharge condition prior to the scanning of a symbol, then after the symbol is scanned it can be identified by detecting the step charger that exhibits the minimum potential. Thus, symbols can be identified regardless of slight variations in the printed symbols due to printing defects, smudges, registration, and the like.

Referring to the figures, the symbol that is to be identified consists, in its usual form, of a black configuration on a white background. This symbol is scanned and converted into a pattern of pulse signals by a scanning device 19. The scanning device disclosed in the copending application entitled Character Recognition Device by Matthew J. Relis, Serial No. 396,280, filed December 4, 1953, and assigned to the same assignee can be utilized. For purposes of illustration and to facilitate the explanation of the operation of this invention the above mentioned scanning device shall be utilized, it being understood, however, that this invention is not restricted to this particular type of scanning device. The scanner chosen for purposes of illustration generates two separate but related signals. The first or video signal appears each time that a portion of the symbol that is being scanned is sensed by the scanning device. The pattern of pulses of this signal is determined by the configuration of the symbol that is being scanned. The second signal that is generated is a train of clock pulses that is initiated by the first occurring video signal of each scan. In this invention the scanning device is preset to generate sixteen clock pulse signals per scan. The number of shift pulse signals generated per scan is not critical and can be increased or decreased to conform with individualistic requirements.

Figure 2:
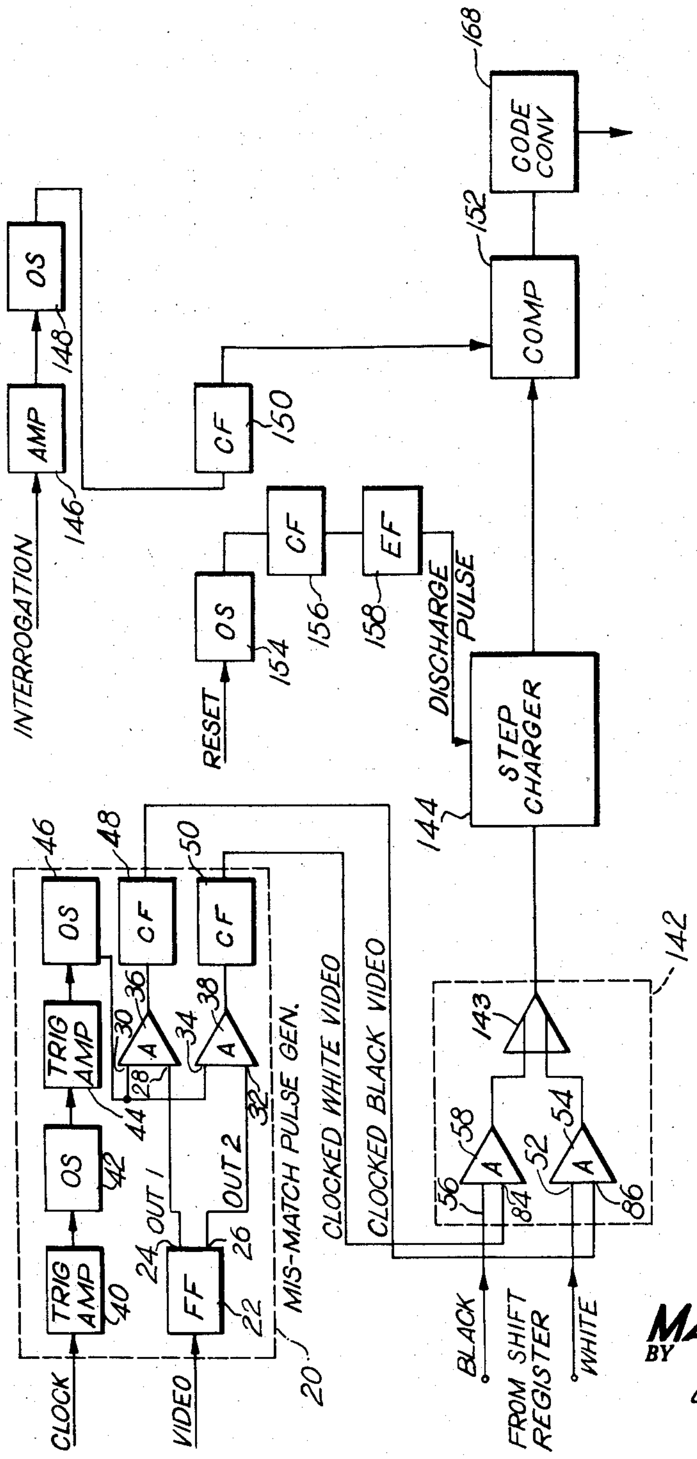
Fig. 2 is a detailed block diagram of the remainder of the invention.

Referring to Fig. 2, the video signal and the generated clock pulse signals from the scanner are fed to two input terminals of a mis-match pulse generator 20. The video signals that have a more positive potential represent the sensing of a black area and, therefore, a portion of a symbol. This positive-going video signal generated by the scanning device will hereinafter be referred to as a black video signal. Its complement, a signal that is more positive only when the black video signal is less positive, represents a scanning of the white or contrasting background area of the scanned symbol. This signal is generated in the mismatch pulse generator from the black video signal and will hereinafter be referred to as a white video signal. Only the black video signal is generated by the scanning device. The positive going pulse portions of the black and white video signals that are coincident with the clock pulse signals are gated through two "and" gates and appear on output terminals of the mismatch pulse generator 20. These signals shall hereinafter be identified as the clocked white video signals and the clocked black video signals. The clocked white video signals and the clocked black video signals appear on a first and a second output terminal respectively of the mismatch pulse generator 20.

Referring to the detailed block diagram of the mismatch pulse generator, the black video signal from the scanner is fed to a flip flop 22, which generates a black video signal and a white video signal at its output terminals 24 and 26 respectively. The black video signal is fed to an input terminal 28 of an "and" gate 36, and the white video signal is fed to an input terminal 32 of an "and" gate 38. The generated clock pulses are fed through an integrator circuit to a trigger amplifier 40 which clips the negative potential spike and inverts the positive potential spike. The inverted signal is fed to a one shot multivibrator 42 to initiate the generation of a plurality of negative pulse signals. The output signals of the multivibrator 42 are fed through an integrator circuit to a trigger amplifier 44 which clips the positive potential spike and feeds the negative potential spike to a one shot multivibrator 46. The multivibrator generates a plurality of positive pulse signals. Thus, for each clock pulse signal that is fed to the trigger amplifier 40 a delayed positive pulse signal appears at the output terminal of the multivibrator 46. The positive potential output signals from the multivibrator 46 are fed to input terminals 30 and 34 of the "and" gates 36 and 38 respectively to gate through the positive appearing pulses of the white and black video signals. Thus, for each appearing modified clock pulse, a positive pulse of the white video signal or a positive pulse of the black video signal is passed through one of the gates 36 or 38.

The signals that appear on the output terminals of the gates 36 or 38 are fed to cathode followers 48 and 50 respectively. The output terminal of the cathode follower 48 passes all positive pulses of the clocked black video signals; and the output terminal of the cathode follower 50 passes all positive pulses of the clock white video signals. The output terminal of the cathode follower 48 is coupled to feed a signal to an input terminal 86 of an "and" gate 54; and the output terminal of the cathode follower 50 is coupled to feed a signal to an input terminal 84 of an "and" gate 58.

Referring to Fig. 1 therein is disclosed structure for the generation of a plurality of discrete patterns of signals wherein each particular pattern represents electrically a particular symbol that is to be identified. Immediately after a symbol is scanned a pulse signal is transmitted to a comparison circuit to identify the symbol. This signal is also fed to the scanner to inhibit the generation of a video signal during the next scan. The next appearing signal from the scanner represents a scan without a video signal and is utilized to generate a single pulse that shall hereinafter be referred to as a reset pulse signal. The reset pulse signal is generated after the scanned symbol has been identified, and it is fed simultaneously to a delay means, to a column counter 60 to reset or clear the counter to zero, and to a shift register driver 62 to reset each of the magnetic cores of a shaft register 64 to a zero state. The output signal from the delay means is fed simultaneously to the column counter 60 to produce a first state, and to the shift register to preset the first magnetic core of the shift register 64 to a "set" or "one" condition. The delay signal that is fed to the column counter shall hereinafter be referred to as the prime pulse signal, and the signal that is fed to the shift register 64 shall hereinafter be referred to as the initiating pulse signal.

Thus, the reset pulse sets the column counter, the shift register driver, and the shift register for the scanning of the next appearing symbol.

The first portion of the new symbol that is sensed initiates the generation of a positive black video signal and a train of clock pulses. The scanner and associated circuits 19 function, also, as a source of signals to generate clock pulses which are fed into the shift register driver 62 to step the one in the first magnetic core serially through the first column of sixteen cores 82. Each appearing clock pulse signal steps the one to the next appearing magnetic core. As each succeeding core of the shift register is brought to the "one" state, the preceding core is returned to the zero state.

As the one is stepped from the sixteenth or last core of the first column of cores 82 to the first core of the second column of cores 96 by the sixteenth and last clock pulse of the first train of generated clock pulses, it is also fed through the buffer 88 to energize the Schmitt trigger 90. The trigger 90 feeds a signal through the cathode follower 92 to set the column counter 60 to a second state to channel all diode matrix input signals to the conductor 94. Thus, the second train of clock pulse signals that are generated are fed through the shift register driver 62 to serially step the bit through the second column of cores 95 to the first magnetic core of the third column of magnetic cores. As the one is fed to the third column of magnetic cores it sets the column counter to a third condition to channel all diode matrix input signals to the output conductor. This cycle continues until the initiating pulse is stepped from the last magnetic core of the last column of magnetic cores at which time it is utilized first to identify the scanned symbol and then to generate the necessary signals to reset the device in preparation for the scanning and identification of the next symbol.

Figure 4:
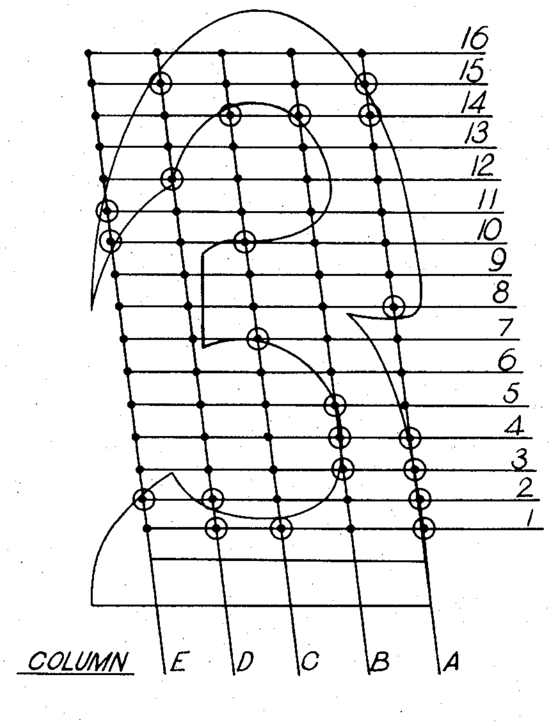
Fig. 4 is a view of the Arabic numeral of Fig. 3 generated by the scanning device and containing a superimposed grid showing the trace of each scan and the position of each area sampled to determine the presence or absence of a portion of the symbol scanned.

The vertical and horizontal scanning rates of the scanner can be constant, and the clock pulses can be generated at equal time intervals. The train of clock pulses generated in the scanner occur once during each scan cycle and are initiated by the first positive pulse black video signal of each scan cycle. The area within which the symbol must be confined is defined along the sides by the first and last vertical scans used in the identification of a symbol, and (assuming the scan traces a path from the bottom to the top of the symbol) by a lower boundary defined by a line which represents a line drawn through the lowermost portion of the dark symbol area of each scan, displaced upwards a small fraction of the symbol height, and by an upper boundary spaced vertically above the lower boundary a distance slightly less than the maximum height of any symbol that is to be identified. Referring to Fig. 4, the boundaries of the area containing the symbol are defined by the substantially vertical lines formed by columns A and E, and by the horizontal lines formed by rows one and sixteen.

The magnetic shift register contains ($m$) times ($n$) magnetic cores wherein: $m$ is the number of vertical scan traces that sense the area allotted to each symbol, and $n$ is the number of points on each scan trace that are sampled by the clock pulse for the presence or absence of a portion of a symbol.

In this invention it shall be assumed that $m$ is five and $n$ is sixteen.

When the shift register is energized to step the initially applied "one" or "bit" through the cores, each activated core generates a noise signal on associated signal conductors, and a back E.M.F. on the shift line. The noise signal is generated by virtue of the stepping of the cores, not by the position of the "bit."

The noise signal is not desirable as it interferes with the operation of the device by generating spurious pulse signals, and the back E.M.F. is objectionable as it retards the build-up of the shifting pulse signal. The magnitudes of the noise signal and the back E.M.F. are proportional to the number of cores energized and, therefore, the magnitudes of these undesirable signals can be decreased by decreasing the number of cores that receive the shift pulse signal simultaneously.

This is accomplished by feeding the shift pulse signal to only one column at a time instead of to all of the columns simultaneously since, at any particular instant, only one column of the shift register will contain the initially applied bit.

The column counter 60 and the diode matrix 72 functions as a switching means to feed successive trains of clock pulses to successive columns of the shift register 64 to step the bit through each of the columns. The inverters and drivers fed by the diode matrix produce shift signals that have the proper polarity and power level.

The flip flops 93, 99 and 104 form a binary counter that is activated by an end of column pulse from the shift register 64 through the buffer 88. The flip flops condition the diode matrix 72 to channel successive trains of clock pulses from the inverter 70 to successive output terminals of the diode matrix 72.

Referring in more detail to the circuitry of the column counter 60, the shift register driver 62, the shift register control 66, and the shift register 64; it shall be assumed that a particular symbol has just been scanned and identified, and that the device has been preset in preparation for the identification of the next appearing symbol that is to be scanned. At some instant during the first scan cycle of the next appearing symbol a positive pulse black video signal will be generated. This signal initiates the generation of a series of sixteen clock pulse signals.

The clock pulses are fed through a one shot multivibrator 68, through an inverter 70, and through a diode matrix 72 of the shift register driver 62 to appear on the conductor 74. The signals on the conductor are fed through an inverter 76 to appear as positive pulse signals. The sixteen positive pulse signals are then fed serially through a buffer 78 to activate a driver 89 which steps the bit in the first core of the magnetic core matrix serially through the first column of sixteen cores 82 of the shift register 64. Each column of magnetic cores represents the trace of a single scan, and each magnetic core represents that area of the scan that corresponds to the positive pulses of the black and white video signals that are coincident with the clock pulses.

Figure 3:
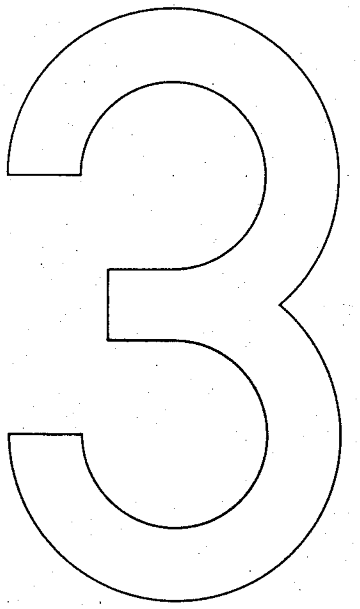
Fig. 3 is a view of an Arabic numeral that is scanned for identification in accordance with the principles of this invention.

For each distinctive symbol that is to be identified a discrete pattern of pulse signals is generated by threading a single wire through particular magnetic cores. Thus, referring to Figs. 3 and 4, in reproducing the symbol "3," shown in Fig. 3, the configuration or plot of the black video signals of the scanned symbol "3" is first obtained (Fig. 4), and then the position of the clock pulse signals A1 through A16, B1 through B16, C1 through C16, D1 through D16, and E1 through E16 relative to the configuration of the positive pulse black video signals is determined. By virtue of the fact that each of the clock pulse signals is utilized, simultaneously, to gate a positive pulse black video signal or a positive pulse white video signal and to step the bit through the shift register 64, it immediately becomes apparent that reference should be made to Fig. 4 in prewiring the shift register for the generation of a pattern of pulses that will be identical with the clocked black video signals and the clocked white video signals.

Each magnetic core physically represents a particular clock pulse of the graph of Fig. 4. For example, it should be noted that for purposes of illustration only, each symbol is scanned five times, and that sixteen clock pulses are associated with each scan. Thus, each symbol that is sensed is represented by a discrete pattern of eighty pulse signals. The cores of the shift register are arranged to simulate the pattern of clock pulses A1 through E16 of Fig. 4, and at each instant that a clock pulse is generated a magnetic core generates a pulse signal.

Thus, to generate electrically the symbol "3" by means of the shift register, reference is made to the graph (Fig. 4) of the black video signal relative to the clock pulses. To generate a discrete pattern of signals similar to the clocked black video signals, a single wire is threaded, in series, through each magnetic core that is associated with the clocked pulses that are coincident with the black video signal. Thus, to generate the clocked black video signals for the symbol "3" in the shift register, those cores that are associated with the clock pulses A9–A13; B1, B2, B6–B10, B15, B16; C8, C9, C15, C16; and D13 and D14; of Fig. 4 are threaded with a single wire. This single wire will hereinafter be referred to as the black core winding, and the positive pulse signals that appear on this winding will hereinafter be referred to as the black core signals.

A second wire is threaded through all of the other magnetic cores, and this wire will hereinafter be referred to as the white core winding. The positive pulse signal that appears on the white core winding will hereinafter be referred to as the white core signal. To prevent the generation of spurious results, those cores which generate pulse signals that represent clocked black or white video signals which are in close proximity to the edge or border of the symbol "3" are not threaded by either the black or white core windings. Thus, referring to Fig. 4 those cores which represent the clocked pulses A1 through A4, A8, A14, A15; B3 through B5, B14; C1, C7, C10, C14; D1, D2, D12, D15; and E2, E10, and E11 are not threaded for the symbol "3" and are circled in Fig. 4 for rapid identification. The black core winding for the symbol "3" is coupled to an input terminal 56 of the "and" gate 58 and the white core winding is coupled to an input terminal 52 of the "and" gate 54. As the bit that was fed to the first core of the shift register 64 is stepped serially through each column of magnetic cores, a discrete pattern of positive pulse signals is generated in the black and white core windings. Except for the absence of positive pulse signals due to the unwired coils, the pattern of signals which appear on the black coil winding for the symbol "3" are identical with the clock black video signals that appear at the output terminal of the "and" gate 36 as the symbol "3" is sensed by the scanning device. Likewise, except for the absence of positive pulse signals due to the unwired coils, the output signals which appear on the white coil winding for the symbol "3" will be identical with the clocked white video signals that appear at the output terminal of the "and" gate 38 when the symbol "3" is sensed by the scanning device.

Thus, for the symbol "3," all of the magnetic cores that generate well-defined scanned signals are threaded with either a white core winding or a black core winding. If a second symbol such as "0" is to be identified, the procedure utilized previously for the threading of the shift register with the black and white core windings for the symbol "3" is repeated. However, in this instant, the black video signal configuration of plot of the symbol "0" is substituted for the configuration of the symbol "3" of Fig. 4.

Thus, the configuration of the black video signal representation for the letter "0" and the position of the pulse signals relative to the configuration, is first determined. Those pulse signals that are coincident with the black video signal indicate the particular magnetic cores of the shift register that are to be threaded black core winding, and all the remaining magnetic cores are threaded with a white magnetic core winding. The cores that generate signals that are not well defined are not threaded with either a black or white core winding. The black and white core windings are fed to a second set of "and" gates similar to the "and" gates 54 and 58. Therefore, to identify two distinctive symbols, each magnetic core will support a maximum of two core windings. The number of wires threading each magnetic core need not be identical as the threading of each core is determined by the electrical equivalent of the symbol generated.

In this manner it is possible to generate electrically the pulse signal patterns of a great many distinctive symbols simultaneously to represent the letters of the alphabet and the arabic numerals. Thus, as the bit is stepped serially through the first column of magnetic cores 82, it generates a plurality of black and white core signals, on each of the black and white core windings that are threaded through the magnetic cores of the first column 82.

When the bit is stepped from the last core of the column 82 to the first core of the column 95 by the last arriving clock pulse of the first scan, it is also fed through an "or" gate 88 to activate a Schmitt trigger 90. The output signal of the trigger 90 is fed through a cathode follower 92 to change the conductive state pattern of the flip flops 93, 99, and 104 to condition the diode matrix 72 to channel all clock pulse signals from the inverter 70 to the conductor 94. The shift register driver 62 is now conditioned to receive a second set of clock pulse signals.

At some instant during the second scan cycle a portion of the symbol will be initially sensed and a black video signal will be generated. The video signal initiates the generation of a second train of sixteen clock pulses which are fed through the diode matrix 72 and the conductor 94 to an inverter 96. The positive output signnals from the inverter 96 are fed through an "or" gate 98 to pulse a driver 100 which steps the bit serially through the column of magnetic cores 95 to the first magnetic core of a third column of magnetic cores 102. When the bit is stepped from the last core of the column of magnetic cores 95 to the first core of the column of magnetic cores 102, it is also fed through the "or" gate 88, to activate the Schmitt trigger 90.

The output pulse signal from the trigger 90 is fed through the cathode follower 92 to alter the conductive state pattern of the flip flops 93, 99 and 104, to condition the diode matrix 72 to channel all incoming clock pulse signals to the output conductor 106. The shift register driver 62 is now conditioned to receive a third train of clock pulse signals. The generation of the first appearing positive pulse of the black video signal initiates a third train of clock pulse signals which is fed through the diode matrix 72, the conductor 106, an inverter 108 and an "or" gate 110 to activate a driver 112. The driver 112 steps the bit in the shift register serially through the column of magnetic cores 102 to the first magnetic core of a column of magnetic cores 114. At the bit is fed to the first core of the column of cores 114, it is also fed through the "or" gate 88 to activate the Schmitt trigger 90. The output signal of the trigger 90 is fed through the cathode follower 92 to change the conductive state pattern of the three series coupled flip flops 93, 99 and 104, to condition diode matrix 72 to channel all clock pulse signals from the inverter 70 to a conductor 107.

The third train of generated clock pulses received by the diode matrix 72 are channelled to the conductor 107 for transmission through an inverter, an "or" gate, and a driver to step the bit through a fourth column of magnetic cores 114. This cycle is continued until the bit is stepped out of the last magnetic core of the last column of magnetic cores 116. It should be noted that while five sets of magnetic cores are shown, there should be as many set of cores as there are vertical scans.

When the initially inserted bit is fed through the last core of the column of magnetic cores 116 it activates a Schmitt trigger 118. The output signal of the trigger is fed through a cathode follower 120 to appear as an interrogation pulse signal which is modified (Fig. 2) and then fed to a comparison circuit to identify the symbol scanned.

The interrogation pulse is also fed to the scanner which generates a reset pulse signal subsequent to the identification of the letter scanned and the resetting of the identifying circuits. The reset signal is fed through an "or" gate 122 and through a cathode follower 124 to reset input terminals 126, 128, and 130 of the flip flops 93, 99 and 104 respectively. The reset pulse sets the three flip flops to the zero state. The reset signal is also fed to a one shot multivibrator 132 which generates a pulse signal that is thirty or forty micro seconds in duration. The output signal from the multivibrator 132 is fed through a cathode follower 134 and through the "or" gates 78, 98, 110, 136 and 138 to activate each of the associated drivers. In this manner, a relatively long pulse signal is applied simultaneously to each of the magnetic cores to clear the shift register of all bits that may be present.

The relatively long pulse holds the magnetic cores of the shift register in their zero state long enough to allow all energy generated by them upon application of the pulse to be dissipated in the coupling circuits between cores. Upon termination of the relatively long pulse all cores will be in a zero state. If the sensing of a particular symbol is abandoned after the first or second scan, but before the termination of the last scan, an interrogation pulse will not be generated to remove the bit from the shift register to prevent the generation of the spurious results. In this instance the removal of the bit is accomplished by feeding a preset signal into the "or" gate 122. The preset signal is identical with the reset signal except that it is generated manually.

The output signal of the one shot multivibrator 132 is also fed to a one shot multivibrator 140 which functions as a delay. The delayed output signal of the multivibrator 140 is fed to the flip flop 93 to set the column counter to a first conductive state pattern. The output signal of the multivibrator 140 is also fed through an amplifier 141 to set or feed a bit to the first core of the first column of magnetic cores 82.

Thus the column counter 60, the shift register driver 62, and the shift register 64 are in condition for the receipt of information from the scanner during the first scan of the next appearing symbol that is to be identified.

For each distinctive symbol that is to be identified there is a pair or set of gates similar to the gates 54 and 58. The first gate of each pair of gates is coupled to receive as input signals the black core signals of each set of core windings, and the clocked white video signals. The second gate of each pair of gates is coupled to receive as input signals the white core signals of each set of core windings, and the clocked black video signals. Thus, in the identification of forty distinctive symbols, forty pairs of "and" gates are connected to receive forty pairs or sets of black and white core signals from the shift register 64, and the clocked black and white video signals from the mismatch pulse generator 20. For each pair of gates the clocked black video signal is gated with the white core signal of a particular set, and the clocked white video signal is gated with the black core signal of the same set. The output signals from each pair of gates of which the gates 54 and 58 are representative, are fed through an "or" gate 143 to a step charger 144.

The "and" gates 54 and 58 function in the usual manner, that being that a signal appears at the output terminal of the gate only when each of the input terminals receive, simultaneously positive polarity signals. In this invention, an output signal will appear at the output terminal of an "and" gate only when the input signal that is initiated by the scanned symbol is not in coincidence with the signal generated by the shift register. For purposes of explanation only it shall be assumed that this invention is preset to identify either one of the two symbols "3" and "0." Thus, there will be two black core windings and two white core windings, one of each for each symbol "3" and "0" respectively, energized by the shift register 64. The first set of black and white core windings will be coupled to a first set of gates similar to the gates 54 and 58, and the second set of black and white core windings will be coupled to a second set of gates which are also similar to the "and" gates 54 and 58. The clocked black video signals from the mismatch pulse generator 20 are fed to the "and" gates that are coupled to receive the white core signals, and the clocked white video signals from the mismatch pulse generator 20 are fed to the "and" gates that are coupled to receive the black core signals. Now, if the symbol "3" is scanned by the scanner, the signals on the input terminals of the pair of "and" gates that are coupled to receive the black and white core signals which represent the symbol "3" will never be in coincidence, and therefore no signals will be passed through either of the gates. The situation is entirely different for the other pair of gates which are coupled to receive the black and white core signals which represent the symbol "0." In this instance, a large portion of the input signals to the pair of gates will be in coincidence, and, therefore, a plurality of pulse signals will pass through these gates. The output terminals of each pair of gates are coupled through an "or" gate to a separate step charger. In operation, the step charger develops a potential which is proportional to the number of pulse signals received by it until saturation occurs. Therefore, in the ideal case, that step charger which is coupled to receive the pulse signals from the set of gates which represent the symbol "3" will exhibit a zero potential while the step charger that is coupled to receive the pulse signals from the pair of gates which represent the symbol "0" will exhibit a substantially larger potential. Thus, it becomes obvious that if shift register 64, the "and" gates 54 and 56 and their associated circuits were increased to represent or identify forty distinctive symbols then forty "or" gates and forty step chargers would be required. However, in the example above, the step charger coupled to receive the pulse signals from the "and" gates which represent the symbol "3" would still exhibit the minimum potential and the potential exhibited by each of the other step chargers would be substantially larger than the potential exhibited by the step charger associated with and representative of the symbol "3." Therefore, to determine the letter which had been scanned the step charger that exhibits the minimum potential must be identified.

Referring further to Figs. 1 and 2, the output signal from the cathode follower 120, utilized as an interrogation pulse, is fed to a trigger amplifier 146. The trigger amplifier utilizes the fall portion of the output signal of the Schmitt trigger 118 to activate a one shot multivibrator 148 which generates a pulse signal that is fed through a cathode follower 150 to a comparison circuit 152. At the instant the comparison circuit receives the pulse signal from the cathode follower 150, it identifies the step charger that exhibits the minimum potential. At a predetermined time after the step charger which exhibits the minimum potential is identified, the reset pulse generated by the scanner is fed to a one shot multivibrator 154. The multivibrator 154 generates and feeds a pulse signal that has a time duration of approximately one hundred micro seconds through a cathode follower 156 to a transistor 158 which is coupled as an emitter follower to the step chargers 144. The transistor, when energized by the signal from the multivibrator 154 is capable of carrying a high current and therefore functions as a switch to discharge each of the step chargers to a zero potential simultaneously. Since an absence of potential is not required to identify the symbol scanned, but rather a minimum of potential, it becomes obvious that a scanned symbol can be out of register or slightly smudged or deformed and still be identified accurately.

The output signals of the comparison circuit are fed to a code converter 168 which converts the scanned information as identified by the step charger into a code which represents that particular symbol.

Obviously many modifications and variations of the present invention are possible in the light of the above teaching. It is, therefore, to be understood that within the scope of the appended claims the invention may be practiced otherwise than as specifically described.

What is claimed is:

1. A character recognition device for the identification of symbols comprising a sensing means that generates a pattern of signals serially for each symbol scanned, a magnetic core shift register, a plurality of conductors interwoven through said magnetic core shift register each forming a separate identifiable symbol, a source of signals coupled to energize said magnetic core shift register to generate patterns of pulse signals on each of said plurality of conductors, and gate means coupled to compare the signal from said sensing means with the signal on each of said plurality of conductors to identify the symbol sensed.

2. A character recognition device for the identification of symbols comprising a sensing means that generates a pattern of signals serially for each symbol scanned, a magnetic core shift register, a plurality of conductors interwoven through said magnetic core shift register each forming a separate identifiable symbol, a source of signals coupled to energize said magnetic core shift register to generate patterns of pulse signals on said plurality of conductors, and AND gates coupled to compare the signal from said sensing means with the signal on each of said plurality of conductors to identify symbols sensed.

3. A character recognition device for the identification of symbols comprising a sensing means that generates a pattern of signals serially for each symbol scanned, a magnetic core shift register, a plurality of conductors interwoven through said magnetic core shift register each forming a separate identifiable symbol, a source of signals coupled to energize said magnetic core shift register to generate patterns of pulse signals on said plurality of conductors, AND gates fed by said sensing means and said plurality of conductors, and step chargers fed by said AND gates to identify the symbols sensed.

4. A character recognition device for the identification of symbols comprising a sensing means that generates a pattern of signals serially for each symbol scanned, pulse generating means activated by said sensing means to generate signals similar and complementary to the signals from said sensing means, a magnetic core shift register, a first plurality of conductors interwoven through said magnetic core shift register each forming a separate identifiable character, a second plurality of conductors interwoven through said magnetic core shift register each forming the background area around a separate identifiable symbol said first and second plurality of conductors cooperating to provide a pair of conductors for each of the identifiable symbols, a source of signals coupled to energize said magnetic core shift register to generate pulse signals on each pair of conductors, and gate means coupled to compare the signals from the pulse generating means with the signals from each pair of conductors to indicate the symbols scanned.

5. A character recognition device for the identification of symbols comprising a sensing means that generates a pattern of signals serially for each symbol scanned, pulse generating means activated by said sensing means to generate signals similar and complementary to the signals from said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair cf conductors, gate means coupled to compare the signals from the pulse generating means with the signals on each pair of conductors, and step chargers fed by said gate means to indicate the symbol sensed.

6. A character recognition device for the identification of symbols comprising a sensing means that generates a pattern of signals serially for each symbol scanned, pulse generating means activated by said sensing means to generate signals similar and complementary to the signals from said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair of conductors, gate means coupled to compare the signals from the pulse generating means with the signals on each pair of conductors, step chargers fed by said gating means to generate a potential proportional to the pattern of the signals on each pair of conductors relative to the signals from the pulse generating means, and comparison means coupled to said step chargers to identify the symbols scanned by indicating the step charger that exhibits a predetermined extreme potential.

7. A character recognition device for the identification of symbols comprising a sensing means that generates a pattern of signals serially for each symbol scanned, pulse generating means activated by said sensing means to generate signals similar and complementary to the signals from said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair of conductors, and comparison means coupled to compare the sensed information with each of the generated signals.

8. A character recognition device for the identification of symbols comprising a sensing means that generates a pattern of signals serially for each symbol scanned, pulse generating means activated by said sensing means to generate signals similar and complementary to the signals generated by said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair of conductors, first gate means coupled to compare one signal from said pulse generating means with the signal on said first conductor of each pair of conductors, second gate means coupled to compare the other signal from said pulse generating means with the signal on said second conductor of each pair of conductors, step charger means fed by said first and second gate means to generate potentials proportional to the signals passed by said first and second gate means, and comparison means coupled to said step charger means to indicate the symbol scanned.

9. A character recognition device for the identification of symbols comprising a sensing means that generates a pattern of signals serially for each symbol scanned, a mis-match pulse generator actuated by said sensing means to generate signals similar and complementary to the signals generated by said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair of conductors, first AND gates coupled to compare one signal from said mis-match pulse generator with the signal on said first conductor of each pair of conductors, second AND gates coupled to compare the other signal from said mis-match pulse generator with the signal on said second conductor of each pair of conductors, step chargers fed by said first and second AND gates to generate a potential proportional to the pattern of the signals on each pair of conductors relative to the signal from the mis-match pulse generator, and comparison means coupled to said step chargers to identify the symbol scanned by indicating the step charger that exhibits a predetermined extreme potential.

10. A character recognition device for the identification of symbols comprising a sensing means that generates a pattern of signals serially for each symbol scanned, a mis-match pulse generator activated by said sensing means to generate signals similar and complementary to the signals generated by said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair of conductors, switching means interposed between said source of signals and said magnetic core shift register to sequentially energize said cores, first AND gates coupled to compare one signal from said mis-match pulse generator with the signal on said first conductor of each pair of conductors, second AND gates coupled to compare the other signal from said mis-match pulse generator with the signal on said second conductor of each pair of conductors, and step chargers fed by said first and second AND gates to generate potentials proportional to the signals passed by said first and second AND gates to indicate the symbol scanned.

11. A character recognition device for the identification of symbols comprising a sensing means that generates a pattern of signals serially for each symbol scanned, a mis-match pulse generator activated by said sensing means to generate signals similar and complementary to the signals generated by said sensing means, a magnetic core shift register, a first plurality of conductors interwoven through said magnetic core shift register each forming a separate identifiable symbol, a second plurality of conductors interwoven through said magnetic core shift register each forming the background area around a separate identifiable symbol said first and second plurality of conductors co-operating to provide a pair of conductors for each of the identifiable symbols, a source of signals coupled to energize said magnetic core shift register to generate pulse signals on each pair of conductors, switching means interposed between said source of signals and said magnetic core shift register to sequentially energize said cores, first plurality of AND gates coupled to compare the signals from said mis-match pulse generator with the signals on said first conductor of each pair conductors, second plurality of AND gates coupled to compare the other signals from said mis-match pulse generator with the signals on said second conductor of each pair of conductors, step charges fed by said first and second AND gates to generate potentials proportional to the pattern of the signals on each pair of conductors relative to the signal from the mis-match pulse generator, and comparison means coupled to said step chargers to identify the symbol scanned by indicating the step charger that exhibits a predetermined extreme potential.

References Cited in the file of this patent

UNITED STATES PATENTS 2,616,983 Zworykin ---------------- Nov. 4, 1952
2,738,499 Sprick ------------------ Mar. 13, 1956

OTHER REFERENCES

Character Recognition by M. H. Glauberman, Electronics, February 1956, pp. 132 to 136.

UNITED STATES PATENT OFFICE

CERTIFICATE OF CORRECTION

Patent No. 2,918,653

Matthew J. Relis — December 22, 1959

It is hereby certified that error appears in the printed specification of the above numbered patent requiring correction and that the said Letters Patent should read as corrected below.

Column 3, line 33, for "or" read -- for --; column 5, line 14, for "delay" read -- delayed --; column 8, line 69, for "At" read -- As --.

Signed and sealed this 21st day of June 1960.

(SEAL)
Attest:

KARL H. AXLINE
Attesting Officer

ROBERT C. WATSON
Commissioner of Patents